(12) United States Patent
McCarthy et al.

(10) Patent No.: US 7,158,881 B2
(45) Date of Patent: *Jan. 2, 2007

(54) NAVIGATION SYSTEM FOR A VEHICLE

(75) Inventors: Kevin C McCarthy, Tucson, AZ (US);
Eugenie V Uhlmann, Tucson, AZ (US); Niall R Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 369 days.

This patent is subject to a terminal disclaimer.

(21) Appl. No.: 10/755,627

(22) Filed: Jan. 12, 2004

(65) Prior Publication Data

US 2004/0148102 A1    Jul. 29, 2004

Related U.S. Application Data

(63) Continuation-in-part of application No. 10/287,178, filed on Nov. 4, 2002, now Pat. No. 6,678,614, which is a continuation of application No. 09/799,414, filed on Mar. 5, 2001, now Pat. No. 6,477,464, and a continuation-in-part of application No. 09/449,121, filed on Nov. 24, 1999, now Pat. No. 6,428,172.

(60) Provisional application No. 60/187,960, filed on Mar. 9, 2000.

(51) Int. Cl.
*G01C 21/26* (2006.01)

(52) U.S. Cl. ............... 701/213; 701/209; 701/210; 701/211; 340/995.19; 340/995.2; 340/461; 342/357.06; 342/357.09; 359/839; 362/459; 362/494

(58) Field of Classification Search ........ 701/207–211, 701/213–215, 23–26; 340/461, 988–991, 340/995.1, 995.2, 995.17, 995.19; 342/357.01, 342/357.06, 357.09; 359/871–872, 838–839
See application file for complete search history.

(56) References Cited

U.S. PATENT DOCUMENTS

| | | | |
|---|---|---|---|
| 5,285,060 A | 2/1994 | Larson et al. | 250/214 AL |
| 5,416,313 A | 5/1995 | Larson et al. | 250/214 AL |
| 5,416,478 A | 5/1995 | Morinaga | 340/995.27 |
| 5,790,973 A | 8/1998 | Blaker et al. | 701/123 |
| 5,877,707 A | 3/1999 | Kowalick | 340/988 |
| 5,899,956 A | 5/1999 | Chan | 701/213 |
| 5,959,367 A | 9/1999 | O'Farrell et al. | 307/10.1 |
| 5,971,552 A | 10/1999 | O'Farrell et al. | 359/871 |
| 5,987,381 A | 11/1999 | Oshizawa | 701/209 |

(Continued)

*Primary Examiner*—Gertrude A. Jeanglaude
(74) *Attorney, Agent, or Firm*—Van Dyke, Gardner, Linn & Burkhart, LLP

(57) ABSTRACT

A navigation system suitable for use in a vehicle includes an interior rearview mirror assembly having an interior reflective element. A database at a site remote from the vehicle includes map data and/or directory data. A global-positioning system receiver is operable to receive signals from satellites external to said vehicles. A transceiver is operable to engage in a wireless communication with a remote transceiver located at a site remote from the vehicle to received data derived from the database. A user input allows a user to input a destination. The system responds to an input of a destination by wirelessly communicating the destination to the remote transceiver and downloading directions. A display that displays turn-by-turn instructions to the destination during the road journey based on the downloaded directions and on the signals received by the global-positioning system receiver. The turn-by-turn instructions may include (i) direction, (ii) when to turn, and/or (iii) how far until the turn. The navigation system preferably includes a short-range wireless communication link.

135 Claims, 2 Drawing Sheets

U.S. PATENT DOCUMENTS

| | | |
|---|---|---|
| 6,087,953 A | 7/2000 | DeLine et al. ............... 248/549 |
| 6,116,743 A | 9/2000 | Hoek ......................... 359/871 |
| 6,172,613 B1 | 1/2001 | DeLine et al. ............. 248/549 |
| 6,175,164 B1 | 1/2001 | O'Farrell et al. .......... 307/10.1 |
| 6,178,377 B1 | 1/2001 | Ishihara et al. ............ 701/200 |
| 6,222,460 B1 | 4/2001 | DeLine et al. ............. 248/549 |
| 6,243,003 B1 | 6/2001 | DeLine et al. ........... 340/425.5 |
| 6,259,412 B1 | 7/2001 | Duroux ...................... 343/713 |
| 6,278,377 B1 | 8/2001 | DeLine et al. ........... 340/815.4 |
| 6,297,781 B1 | 10/2001 | Turnbull et al. ............ 343/713 |
| 6,326,613 B1 | 12/2001 | Heslin et al. ............... 250/239 |
| 6,329,925 B1 | 12/2001 | Skiver et al. ............. 340/815.4 |
| 6,351,708 B1 | 2/2002 | Takagi et al. ............... 701/209 |
| 6,366,213 B1 | 4/2002 | DeLine et al. ........... 340/425.5 |
| 6,386,742 B1 | 5/2002 | DeLine et al. ............... 362/135 |
| 6,420,975 B1 | 7/2002 | DeLine et al. ........... 340/815.4 |
| 6,428,172 B1 | 8/2002 | Hutzel et al. ............... 359/838 |
| 6,477,464 B1 | 11/2002 | McCarthy et al. .......... 701/213 |
| 6,678,614 B1 | 1/2004 | McCarthy et al. .......... 701/213 |
| 6,690,268 B1 * | 2/2004 | Schofield et al. ........... 340/438 |
| 6,906,632 B1 * | 6/2005 | DeLine et al. ........... 340/815.4 |
| 6,975,215 B1 * | 12/2005 | Schofield et al. ........... 340/438 |

\* cited by examiner

NAVIGATION SYSTEM FOR A VEHICLE

CROSS-REFERENCE TO RELATED APPLICATION

This application is a continuation of patent application Ser. No. 10/287,178, filed on Nov. 4, 2002, now U.S. Pat. No. 6,678,614, which is a continuation of patent application Ser. No. 09/799,414, filed on Mar. 5, 2001, now U.S. Pat. No. 6,447,464, which claims priority from U.S. provisional patent application Ser. No. 60/187,960, filed on Mar. 9, 2000, the disclosures of which are hereby incorporated herein by reference in their entireties, and is a continuation-in-part of U.S. patent application Ser. No. 09/449,121, filed on Nov. 24, 1999, now U.S. Pat. No. 6,428,172 B1.

BACKGROUND OF THE INVENTION

Vehicle-based global-positioning systems (GPS) are capable of providing complete mapping information, including street layout, street names, directions, landmarks, addresses, and the like. However, consumers often have difficulty reading maps, especially when presented on a video screen, and the study of complex information, such as a map while driving, may dangerously distract from the driving task. Vehicle mirror assemblies are desirable locations for an GPS antenna, such as disclosed in commonly assigned U.S. Pat. No. 5,971,552, the entire disclosure of which is hereby incorporated by reference.

SUMMARY OF THE INVENTION

The present invention fulfills a need to intelligently filter mapping information in a manner that provides useful and usable data to the driver. The present invention also provides an economical driver-usable global-positioning system (GPS) display. A vehicular rearview mirror-based navigation system, according to an aspect of the invention, includes a rearview mirror system, including an interior rearview mirror assembly. The interior rearview mirror assembly includes an interior reflective element and an interior mirror housing for the interior reflective element. The interior rearview mirror assembly further includes a scrolling display. The scrolling display displays scrolling driver informational messages on the scrolling display.

A vehicular review mirror-based navigation system, according to another aspect of the invention, includes a rearview mirror system having an interior rearview mirror assembly. The interior rearview mirror assembly includes an interior reflective element and an interior mirror housing for the interior reflective element. The interior rearview mirror assembly further includes a GPS display. The GPS display receives an output from a GPS receiving system and displays turn-by-turn information to a vehicle driver.

One aspect of the present invention offers a complete GPS system, including antenna, receiver and a GPS information display into a vehicular mirror assembly, and particularly an interior rearview mirror assembly. Provision of such a mirror-mounted GPS system as a unitary, complete assembly has several advantages, including obviating an automaker from having to specifically design a dashboard or other interior cabin spaces and would decrease the time to market associated with such level of feature integration. Also, provision of a mirror-mounted GPS system as a unitary, complete assembly facilitates supply of such assemblies as retrofits and as aftermarket installations, and generally increases an automaker's ability to offer a GPS feature as an option on selected vehicles.

A particular advantage from locating the information display of a GPS system at the interior rearview mirror assembly in the interior vehicular cabin is that such a mirror-mounted GPS display can facilitate multi-tasking by the driver. Thus, there is a need to intelligently filter mapping information to provide useful, but usable, data to the driver. A further object of this present invention is to economically provide a driver-usable GPS display. Map displays are currently one of the largest cost factors in vehicle navigational systems. Thus, it would be desirable to avoid or reduce this cost by providing a simpler means of display to the driver.

Another aspect of this invention is the location of the GPS antenna and the receiver in the exterior side view assembly. A further aspect is the processing by that exterior side view mirror receiver of GPS location data received by the antenna and fed from there to the receiver, providing an output from that location, that is external to the vehicle cabin, into the vehicle cabin. This has the advantage of the optimal field of view for the antenna for communication to GPS satellites. The placement of the receiver in an exterior side view mirror assembly in close proximity to the antenna also is preferred to avoid RFI and EMC issues associated with low level RF signals. Locating the GPS antenna at a distance from the GPS receiver may render the GPS system subject to stray RF noise from cellular phones and high power portable transmitters, such as CB's and handheld radios.

DESCRIPTION OF THE PREFERRED EMBODIMENT

Figure 1:
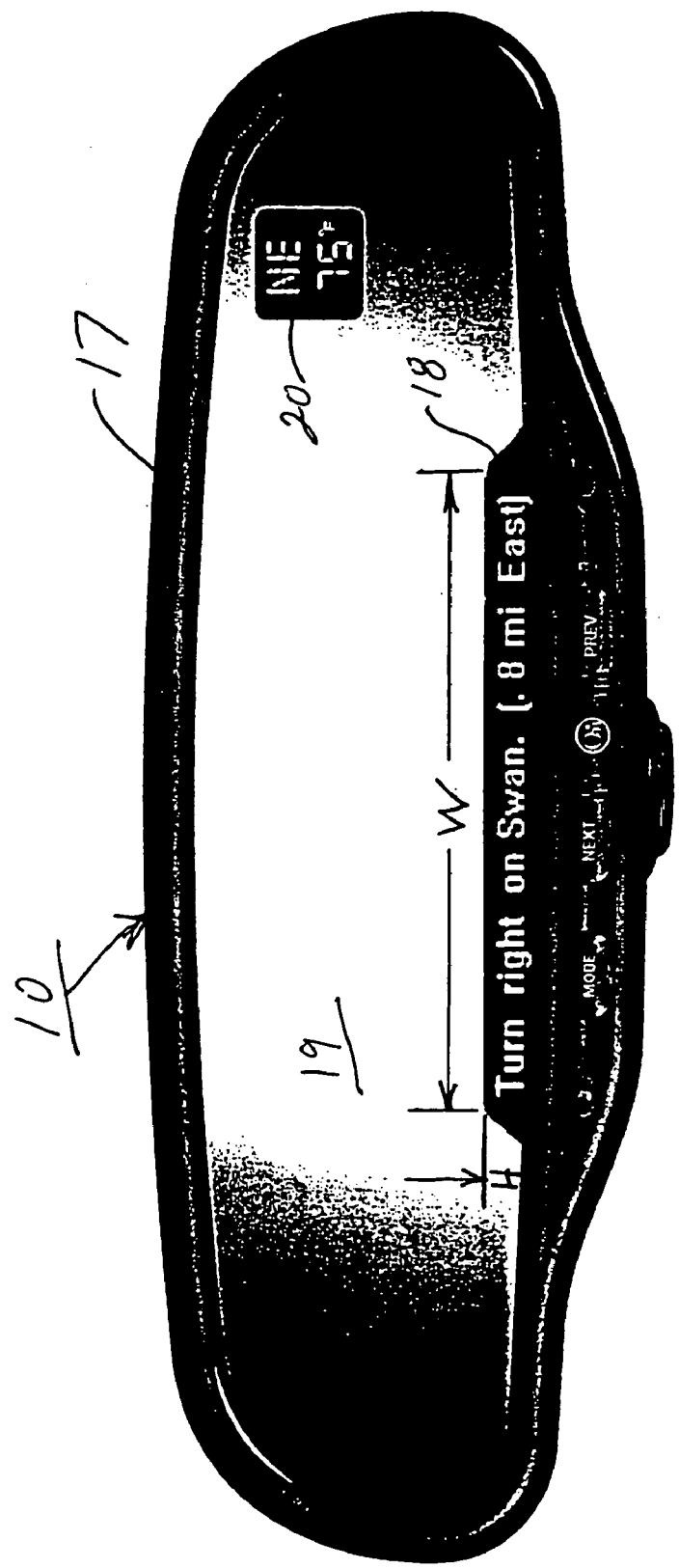
FIG. 1 is a front elevation of a vehicular rearview mirror assembly, according to the invention.
Figure 2:
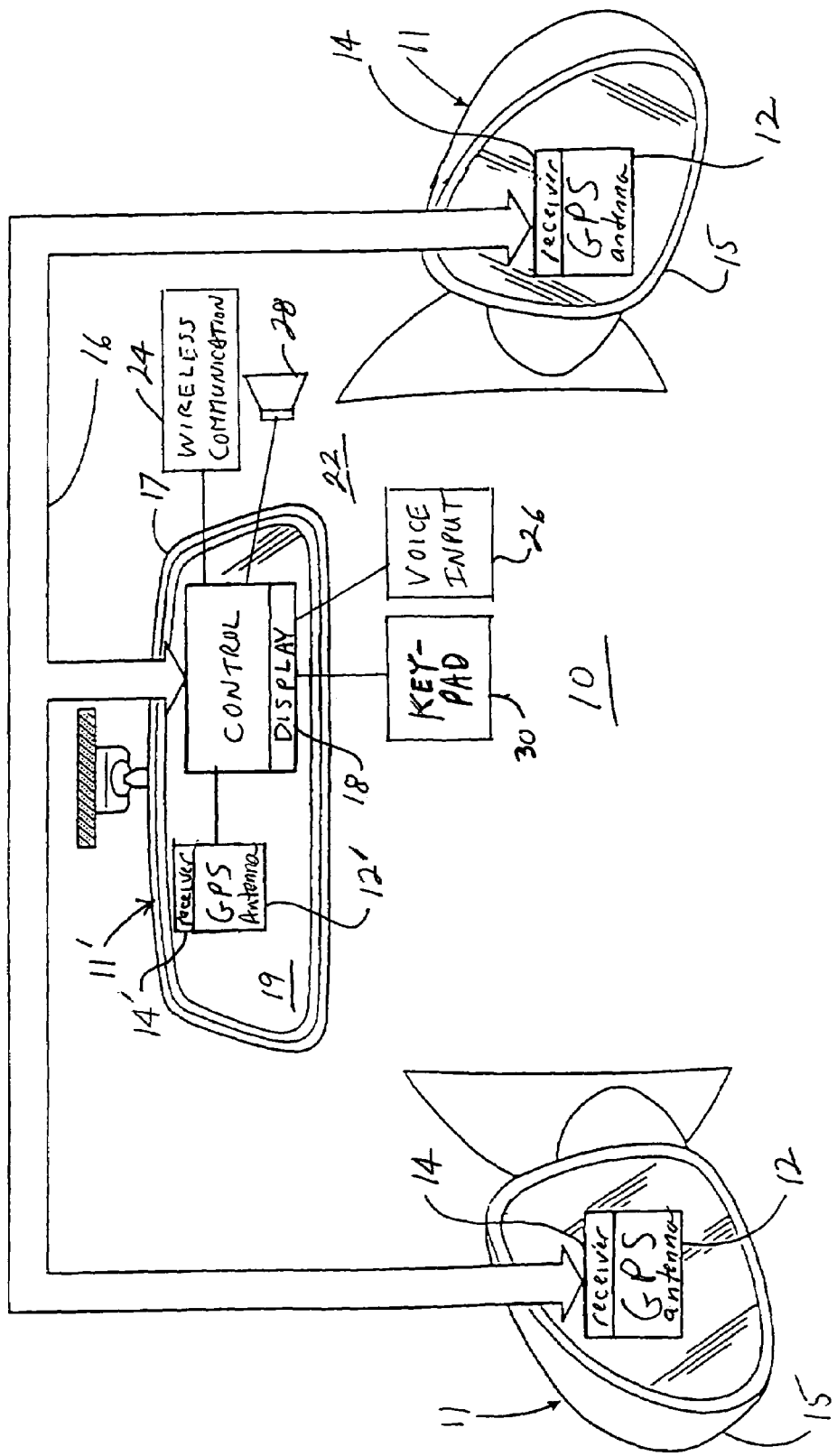
FIG. 2 is a block diagram of a vehicular rearview mirror-based navigation system, according to the invention.

Referring now to the drawings and the illustrated embodiments depicted therein, a vehicular rearview mirror-based navigation system 10, in a preferred embodiment of the present invention, includes one or more GPS receiving systems 11 exterior mirror-mounted antennas 12 that receive location information form GPS satellites. A GPS receiver 14, to which is connected the GPS antenna 12, may also be mounted within an exterior side view mirror assembly 15. The geographic data output from the GPS receiver 14 is then transferred to an interior rearview mirror assembly 17 for display with the driver via a communication channel 16 such as by a wire connection, a vehicle data bus connection such as a LIN (Local Interconnect Network) or a CAN bus, as known in the art, or wirelessly such as via short-range RF data transmission using a protocol such as the BLUE-TOOTH protocol such as is available from Motorola of Schaumberg, Ill. Alternatively, a GPS receiving system 11 including an interior-mounted GPS antenna 12' and GPS receiver 14' may be mounted at interior rearview mirror assembly 17. More particularly, the interior-mounted GPS antenna 12' and/or the GPS receiver 14' may be positioned at either the movable portion of the interior rearview mirror assembly or the fixed portion of the interior rearview mirror assembly. Preferably, the display of the GPS information at interior rearview mirror assembly 17 provides driver infor mational messages such as turn-by-turn instructions, such as shown in FIG. 1. This can be displayed using a dot-matrix, pixelated display 18 such as vacuum fluorescent display or an organic electro-luminescent display or a field-emission display or a plasma display or a similar light-emitting display, or by a non-emitting display such as a liquid crystal display in the chin of the interior mirror assembly mirror, in an eyebrow over the mirror and/or in a display visible within the mirror reflector 19 which would update the driver by line-by-line or by scrolling messages which keep the driver updated using GPS positioning techniques such as differential location discrimination which has preferred accuracy of less than 5 m.

Another aspect of the present invention to the simplification of driver instructions is the use of a simple compass/directional heading display 20 at the interior mirror assembly. For example, if the system needed to communicate that the driver needed to turn right when heading north, heading display 18 may flash the "East" compass heading. Audible alerts or other noises could alert the driver that a directional change was needed. Another means of display could be arrows and the like.

A further aspect of the present invention is the data input generally shown at 22. The driver will typically desire to input the destination to the GPS system. This can be done several ways. A preferred method would be to take advantage of an existing vehicular wireless telecommunication system 24. Many existing mirror products are already the location for these systems. For example, the driver would activate a vehicular wireless communication system such as the OnStar™ system at General Motors which would contact a remote operator or remote voice input system. This may be accomplished utilizing principles disclosed in commonly assigned U.S. patent application Ser. Nos. 09/466,010 filed Dec. 17, 1999; Ser. No. 09/396,179 filed Sep. 14, 1999; Ser. No. 09/382,720 filed Aug. 25, 1999; Ser. No. 09/449,121 filed Nov. 24, 1999; Ser. No. 09/433,467 filed Nov. 4, 1999; and Ser. No. 09/448,700 filed Nov. 24, 1999, the disclosures of which are hereby incorporated herein by reference. The driver would then tell the operator, such as via a voice input 26, the desired final destination; this takes advantage of the operators' vast data banks for locations and human interaction to help find the destination of choice if you do not know the exact address. The operator would then download the turn-by-turn directions to your mirror. The driver will then be notified by the scrolling messages on the display in the mirror when to turn, how far until the turn, and the direction. The GPS system could update the display in real time as you travel. Audible chirps delivered by a speaker 28 could alert the driver when approaching a turn or if the driver has missed a turn. Thus, the remote Onstar™ or equivalent system maintains the detailed maps and directories, and this is fed back wirelessly to the vehicle for display at the interior rearview mirror of directional guidance information.

In addition to this, the driver may simply have a keypad 30 to enter the destination by spelling the address. Keypad 30 could be hardwire-connected to internal rearview mirror 17 or be connected via a wireless link.

BLUETOOTH technology form Motorola, or a similar short-range RF transmission system, could be incorporated for wireless interface with the GPS receiver. This allows for better performance in urban canyons and locations with extreme foliage. The exterior mirror-mounted GPS system 11 could improve handheld GPS devices due to a more powerful antenna 12, which does not operate from a small handheld battery or suffer from the limited size and weight constraints. In addition, the vehicular GPS system could have more data storage, faster processing speeds, increased bandwidth for full internet access, increased software and potential to transfer data via 2-way paging such Creatalink 2 by Motorola thereby lowering operating costs to the user. The data could then be transferred back to the mobile unit for display or storage or the handheld features could then be transferred to the vehicle for hands free operation through voice recognition. This could also include smart phones with an IP address and personal digital assistants (PDA). In addition, smart cards might be inserted into the mirror and information exchanged in this manner.

The driver could also simply have the instructions downloaded to mirror 17 without GPS system 11. This would involve the operator using their cellular service to triangulate your position then download the turn-by-turn directions to your mirror based on your current position and your destination. Then, as you complete each step of the direction, you can scroll to the next direction. This eliminates the cost of the GPS solution, but may not allow for real time positioning. It does offer a simple and effective way to display the information to the driver in a location where the driver is not forced to take their eyes off the road.

It is preferred that the display of GPS-derived driving directional instructions and allied information be displayed at interior mirror assembly 17 as a reconfigurable display such as a multi-pixel display with individually addressable display pixel elements, such as is known in the display arts. Also, it is preferable that the display have an aspect ratio (defined as ratio of the width dimension of the display to its height dimension) of at least about 3, more preferably at least about 5, and most preferably at least about 10 in order to present driving instructions to the driver in a readily readable form. For example, the "Turn right on Swan, etc." driver instruction shown at the interior mirror assembly in FIG. 1 has a desirably large aspect ratio. Also, preferably, the width dimension W of the display is at least about 4 cm, more preferably at least about 6 cm and most preferably at least about 10 cm in width dimension. Also, preferably, the height dimension H is at least about 0.5 cm, more preferably at least about 0.6 cm and most preferably at least about 1 cm in height dimension. Use of the preferred aspect ratios and dimensions ensures that the driver can readily read and interpret the mirror-displayed driving instructions.

Also, where display 18 is disposed behind reflective element 19 of interior mirror assembly 17, and when the reflective element is an electrically variable reflectance element such as an electro-optic mirror such as an electrochromic mirror, it is preferred that the intensity of the scrolling GPS-derived directional information display be increased whenever any overlaying variable opacity element, such as an electrochromic medium, decreases in transmission. Thus, when an electrochromic mirror element that the display is viewed through dims, the intensity of the display increases to compensate for the mirror dimming, such as is disclosed in U.S. Pat. Nos. 5,285,060 and 5,416,313, the entire disclosures of which are hereby incorporated herein.

Further, scrolling GPS-derived driving instruction information can be displayed at an interior mirror-mounted video screen, such as is disclosed in provisional pat. application Ser. No. 60/186,520 filed Mar. 2, 2000, entitled INTERIOR REARVIEW MIRROR ASSEMBLY INCORPORATING A VIDEO SCREEN and in commonly assigned U.S. patent application Ser. No. 09/449,121 filed Nov. 24, 1999, by Hutzel et al., the entire disclosures of which are hereby incorporated herein.

Also, optionally, a forward-facing video camera, such as a CMOS or CCD camera, can be mounted to the vehicle, such as disclosed in commonly assigned U.S. Pat. No. 5,796,094 and published International Application No. WO 99/23828, the disclosures of which are hereby incorporated herein by reference, that views the forward scene ahead of the vehicle as it travels on a road. Optionally, the video image of the forward scene can be displayed at a mirror-mounted video screen, or at a video screen mounted elsewhere in the vehicle cabin such as in or at the dashboard. Preferably, a computer-produced graphic overlayer/image highlight/picture-in-a-picture for this forward-viewing video image is generated that is derived from geographic information received from the in-vehicle GPS system. Thus, the driver can view a video screen, which preferably is located at the interior rearview mirror assembly, and can see a graphic overlay on the captured forward video image that guides the driver to turn left or right at an upcoming intersection whose image is displayed on the video screen, a highway on/off ramp the driver is to take can be highlighted on the video screen, a destination building can be highlighted (such as by flashing the part of the video screen where the building is being displayed), etc.

Also, where a video-based rear vision display is included in the vehicle, such as disclosed in commonly assigned U.S. Pat. No. 5,670,935 and published International Application No. WO 96/38319, the disclosures of which are hereby incorporated herein by reference, driver instructional data, maps, and the like, can, optionally, be co-displayed with the video image of the rearward scene. The driver instructional data, maps, and the like, can be derived from the GPS data received by the in-vehicle GPS system, and may be co-displayed via a graphic overlayer or a picture-in-a-picture, or the like.

The global-positioning system display of the present invention may be incorporated into video screens or video display assemblies, which may be displayed at or adjacent to the interior rearview mirror assembly, such as in a module or a pod or the like, such as described in U.S. utility application entitled VIDEO MIRROR SYSTEMS INCORPORATING AN ACCESSORY MODULE, filed by Kenneth Schofield, Frank O'Brien, Robert L. Bingle, and Niall R. Lynam on Feb. 26, 2001 and U.S. provisional applications entitled VIDEO MIRROR SYSTEMS INCORPORATING AN ACCESSORY MODULE, Ser. No. 60/263,680, filed Jan. 23, 2001; VIDEO MIRROR SYSTEMS INCORPORATING AN ACCESSORY MODULE, Ser. No. 60/243,986, filed Oct. 27, 2000; VIDEO MIRROR SYSTEMS, Ser. No. 60/238,483, filed Oct. 6, 2000; VIDEO MIRROR SYSTEMS, Ser. No. 60/237,077, filed Sep. 30, 2000; VIDEO MIRROR SYSTEMS, Ser. No. 60/234,412, filed Jul. 21, 2000; INTERIOR REARVIEW MIRROR ASSEMBLY INCORPORATING A VIDEO SCREEN, Ser. No. 60/218,336, filed Jul. 14, 2000; and INTERIOR REARVIEW MIRROR ASSEMBLY INCORPORATING A VIDEO SCREEN, Ser. No. 60/186,520, filed Mar. 2, 2000, the entire disclosures of which are herein incorporated by reference. As described in the above-referenced applications, such video screens may be incorporated into the interior rearview mirror assembly or provided at locations within the vehicle separate from the interior rearview mirror assembly. The video display assemblies similarly may be incorporated into the interior rearview mirror assembly, such as by mounting the video display assembly to the interior mirror support or mirror mount or to a pod, or may be separately mounted, such as either above the interior rearview mirror assembly or below the interior rearview mirror assembly. For further variations and details of the mounting of the video screen(s) or the video display assembly, reference is made to the above-referenced applications.

Such video screens or video display assemblies may be used to display the output from a rear vision back-up camera, such as disclosed in co-pending applications Ser. No. 09/199,907, filed Nov. 25, 1998, and Ser. No. 09/361,814, filed Jul. 27, 1999, commonly assigned to Donnelly Corporation, the disclosures of which are herein incorporated by reference in their entireties, along with vehicle instrument status, such as a vehicle information display, such as information relating to fuel gauge levels, speed, climate control setting, GPS directional instructions, tire pressure status, instrument and vehicle function status, and the like. In addition, such video screens may display a panoramic image, such as described in U.S. Pat. Nos. 5,670,935 and 5,550,677 and U.S. patent applications entitled WIDE ANGLE IMAGE CAPTURE SYSTEM FOR VEHICLES, Ser. No. 09/199,907, filed Nov. 25, 1998, and WIDE ANGLE IMAGING SYSTEM, Ser. No. 09/361,814, filed Jul. 27, 1999, the disclosures of which are herein incorporated by reference in their entireties, and can be used instead of a conventional mirror reflector. Other displays or images that may be displayed on the video screen include: a rain sensor operation display, a telephone information display, a highway status information display, a blind spot indicator display, a hazard warning display, a vehicle status display, a page message display, a speedometer display, a tachometer display, an audio system display, a fuel gage display, a heater control display, an air-conditioning system display, a status of inflation of tires display, an E-mail message display, a compass display, an engine coolant temperature display, an oil pressure display, a cellular phone operation display, a global-positioning display, a weather information display, a temperature display, a traffic information display, a telephone number display, a fuel status display, a battery condition display, a time display, a train approach warning display, and a tollbooth transaction display. Furthermore, information displays may be incorporated which provide information to the driver or occupants of the vehicle, such as warnings relating to the status of the passenger airbag. In commonly assigned co-pending application Ser. No. 09/244,726, filed by Jonathan E. DeLine and Niall R. Lynam, on Feb. 5, 1999, information displays are provided which include information relating to vehicle or engine status, warning information, and the like, such as information relating to oil pressure, fuel remaining, time, temperature, compass headings for vehicle direction, and the like, the disclosure of which is incorporated herein by reference in its entirety. The passenger side air bag on/off signal may be derived from various types of seat occupancy detectors such as by video surveillance of the passenger seat as disclosed in co-pending, commonly assigned international application Ser. No. PCT/US94/01954, filed Feb. 25, 1994, the disclosure of which is hereby incorporated by reference, or by ultrasonic or sonar detection, infrared sensing, pyrodetection, weight detection, or the like. Alternately, enablement/displayment of the passenger side air bag operation can be controlled manually such as through a user-operated switch operated with the ignition key of the vehicle in which the mirror assembly is mounted as described in co-pending, commonly assigned U.S. patent application Ser. No. 08/799,734, filed Feb. 12, 1997, the disclosure of which is incorporated by reference herein in its entirety.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A navigation system suitable for use in a vehicle comprising:
    a vehicle;
    said vehicle including an interior rearview mirror assembly, said interior rearview mirror assembly comprising an interior reflective element, said interior rearview mirror assembly further comprising a display;
    a database at a site remote from said vehicle, said database including at least one chosen from map data and directory data;
    a global-positioning system receiver, said global-positioning system receiver locatable in said vehicle during a road journey, said global-positioning system receiver operable to receive signals from satellites external to said vehicle;
    a transceiver operable to engage in a wireless communication with a remote transceiver located at a site remote from said vehicle, said transceiver locatable in said vehicle during said road journey;
    said transceiver operable to receive a wireless data transmission from said remote transceiver of data derived from said database;
    a user input whereby a user can input a destination, said system responsive to said input of said destination by wirelessly communicating said destination to said remote transceiver;
    said wireless data transmission from said remote transceiver to said transceiver comprising downloading of directions generally to said destination, said directions being derived from said database;
    said display at said interior mirror displaying turn-by-turn instructions to said destination during said road journey, said turn-by-turn instructions being based on said downloaded directions and on said signals received by said global-positioning system receiver;
    wherein said turn-by-turn instructions comprise at least one chosen from (i) direction, (ii) when to turn, and (iii) how far until the turn; and
    wherein said navigation system includes a short-range wireless communication link.

2. The system in claim 1 wherein said user input comprises at least one chosen from a voice input and a keypad input.

3. The system in claim 2 wherein said receiver is positioned at said interior mirror assembly.

4. The system in claim 2 wherein said navigation system includes a vehicle data bus connection.

5. The system in claim 2 wherein said short-range wireless communication link comprises a short-range radio frequency wireless communication link.

6. The system in claim 5 wherein said short-range radio frequency wireless communication link comprises a BLUETOOTH protocol.

7. The system in claim 1 including an alert to the driver, said alert comprising at least one chosen from an audible alert and a visible alert.

8. The system in claim 7 wherein said alert comprises an audible alert.

9. The system in claim 7 wherein said alert comprises a visible alert.

10. The system in claim 9 wherein said visible alert comprises a flashing display.

11. The system in claim 7 wherein said alert comprises an alert that a turn is being approached.

12. The system in claim 7 wherein said alert comprises an alert that a turn has been missed.

13. The system in claim 1 wherein said display comprises a dot-matrix pixelated display, said dot-matrix pixelated display operable to display a textural driver instruction.

14. The system in claim 13 wherein said display is selected from the group consisting of a vacuum fluorescent display, an organic electro-luminescent display, a field-emission display, a plasma display, a light-emitting diode display, and a liquid crystal display.

15. The system in claim 1 wherein said display is positioned at said interior reflective element.

16. The system in claim 1 wherein said interior rearview mirror assembly comprises a housing and wherein said display is positioned at said housing.

17. The system in claim 1 wherein said vehicle further includes at least one exterior rearview mirror assembly.

18. The system in claim 17 wherein said global-positioning system receiver comprises an antenna.

19. The system in claim 18 wherein said antenna is positioned at one of said interior mirror assembly and said exterior mirror assembly.

20. The system in claim 19 wherein said antenna is positioned at said interior mirror assembly.

21. The system in claim 19 wherein said antenna is positioned at said exterior rearview mirror assembly.

22. The system in claim 1 wherein said display displays at least one chosen from compass and directional heading information.

23. The system in claim 1 further including an audio output generator indicating a need to change direction.

24. The system in claim 1 wherein said display comprises a reconfigurable display.

25. The system in claim 24 wherein said display also displays other vehicle functions.

26. The system in claim 1 wherein said user input comprises voice input.

27. The system in claim 26 wherein said vehicle includes a system for receiving voice commands from the driver.

28. The system in claim 1 wherein said user input comprises a keypad.

29. The system in claim 28 wherein said keypad is connected with said interior mirror assembly.

30. The system in claim 29 wherein said keypad is wirelessly connected with said interior mirror assembly.

31. The system in claim 1 wherein said reflective element comprises an electro-optic reflective element.

32. The system in claim 31 wherein said electro-optic reflective element comprises an electrochromic reflective element.

33. The system in claim 1 wherein said short-range wireless communication link comprises a short-range radio frequency wireless communication link.

34. The system in claim 33 wherein said short-range radio frequency wireless communication link comprises a BLUETOOTH protocol.

35. The system in claim 1 including an image capture device, said image capture device viewing a scene exterior of the vehicle, wherein said display displays the exterior scene captured with said image capture device, said display displaying a graphic overlay that guides the driver with turn-by-turn instructions.

36. A navigation system suitable for use in a vehicle comprising:
a vehicle;
said vehicle including an interior rearview mirror assembly, said interior rearview mirror assembly comprising an interior reflective element;
an image capture device, said image capture device viewing a scene exterior of the vehicle;
a database at a site remote from said vehicle, said database including at least one chosen from map data and directory data;
a global-positioning system receiver, said global-positioning system receiver locatable in said vehicle during a road journey, said global-positioning system receiver operable to receive signals from satellites external to said vehicle;
a transceiver operable to engage in a wireless communication with a remote transceiver located at a site remote from said vehicle, said transceiver locatable in said vehicle during said road journey;
said transceiver operable to receive a wireless data transmission from said remote transceiver of data derived from said database;
a user input whereby a user can input a destination, said system responsive to said input of said destination by wirelessly communicating said destination to said remote transceiver;
said wireless data transmission from said remote transceiver to said transceiver comprising downloading of directions generally to said destination, said directions being derived from said database;
a display displaying the exterior scene captured with said image capture device, said display displaying a graphic overlay that guides the driver with turn-by-turn instructions, said turn-by-turn instructions being based on said downloaded directions and on said signals received by said global-positioning system receiver.

37. The system in claim 36 wherein said display is at or adjacent to said interior rearview mirror assembly.

38. The system in claim 37 wherein said short-range wireless communication link comprises a short-range radio frequency wireless communication link.

39. The system in claim 38 wherein said short-range radio frequency wireless communication link comprises a BLUETOOTH protocol.

40. The system in claim 36 wherein said user input comprises at least one chosen from a voice input and a keypad input.

41. The system in claim 36 including an alert to the driver, said alert comprising at least one chosen from an audible alert and a visible alert.

42. The system in claim 41 wherein said alert comprises an audible alert.

43. The system in claim 41 wherein said alert comprises a visible alert.

44. The system in claim 43 wherein said visible alert comprises a flashing display.

45. The system in claim 41 wherein said alert comprises an alert that a turn is being approached.

46. The system in claim 41 wherein said alert comprises an alert that a turn has been missed.

47. The system in claim 36 wherein said display comprises a dot-matrix pixelated display, said dot-matrix pixelated display operable to display a textural driver instruction.

48. The system in claim 47 wherein said display is selected from the group consisting of a vacuum fluorescent display, an organic electro-luminescent display, a field-emission display, a plasma display, a light-emitting diode display, and a liquid crystal display.

49. The system in claim 36 wherein said display is positioned at said interior reflective element.

50. The system in claim 36 wherein said interior rearview mirror assembly comprises a housing and wherein said display is positioned at said housing.

51. The system in claim 36 wherein said vehicle further includes at least one exterior rearview mirror assembly.

52. The system in claim 51 wherein said global-positioning system receiver comprises an antenna.

53. The system in claim 52 wherein said antenna is positioned at one of said interior mirror assembly and said exterior mirror assembly.

54. The system in claim 53 wherein said antenna is positioned at said interior mirror assembly.

55. The system in claim 53 wherein said receiver is positioned at said interior mirror assembly.

56. The system in claim 53 wherein said antenna is positioned at said exterior rearview mirror assembly.

57. The system in claim 36 wherein said navigation system includes a vehicle data bus connection.

58. The system in claim 36 wherein said display displays at least one chosen from compass and directional heading information.

59. The system in claim 36 further including an audio output generator indicating a need to change direction.

60. The system in claim 36 wherein said display comprises a reconfigurable display.

61. The system in claim 60 wherein said display also displays other vehicle functions.

62. The system in claim 36 wherein said user input comprises voice input.

63. The system in claim 62 wherein said vehicle includes a system for receiving voice commands from the driver.

64. The system in claim 36 wherein said user input comprises a keypad.

65. The system in claim 64 wherein said keypad is connected with said interior mirror assembly.

66. The system in claim 64 wherein said keypad is wirelessly connected with said interior mirror assembly.

67. The system in claim 36 wherein said reflective element comprises an electro-optic reflective element.

68. The system in claim 67 wherein said electro-optic reflective element comprises an electrochromic reflective element.

69. The system in claim 36 wherein said short-range wireless communication link comprises a short-range radio frequency wireless communication link.

70. The system in claim 69 wherein said short-range radio frequency wireless communication link comprises a BLUETOOTH protocol.

71. A navigation system suitable for use in a vehicle comprising:
a vehicle;
said vehicle including an interior rearview mirror assembly, said interior rearview mirror assembly comprising an interior reflective element, said interior rearview mirror assembly further comprising a display;
a database at a site remote from said vehicle, said database including at least one chosen from map data and directory data;
a global-positioning system receiver, said global-positioning system receiver locatable in said vehicle during a road journey, said global-positioning system receiver operable to receive signals from satellites external to said vehicle;

a transceiver operable to engage in a wireless communication with a remote transceiver located at a site remote from said vehicle to a transceiver, said transceiver locatable in said vehicle during said road journey;

said transceiver operable to receive a wireless data transmission from said remote transceiver of data derived from said database;

a user input whereby a user can input a destination, said system responsive to said input of said destination by wirelessly communicating said destination to said remote transceiver;

said wireless data transmission from said remote transceiver to said transceiver comprising downloading of directions generally to said destination, said directions being derived from said database;

said display at said interior mirror displaying turn-by-turn instructions to said destination during said road journey, said turn-by-turn instructions being based on said downloaded directions and on said signals received by said global-positioning system receiver;

wherein said navigation system includes a short-range wireless radio frequency communication link; and wherein said user input comprises at least one chosen from a voice input and a keypad input.

72. The system in claim 71 wherein said display is at or adjacent to said interior rearview mirror assembly.

73. The system in claim 72 wherein said display is mounted to one chosen from said interior rearview mirror assembly support and a mirror mount.

74. The system in claim 72 wherein said display is mounted either above or below said reflective element.

75. The system in claim 71 including an alert to the driver, said alert comprising at least one chosen from an audible alert and a visible alert.

76. The system in claim 75 wherein said alert comprises an audible alert.

77. The system in claim 75 wherein said alert comprises a visible alert.

78. The system in claim 77 wherein said visible alert comprises a flashing display.

79. The system in claim 75 wherein said alert comprises an alert that a turn is being approached.

80. The system in claim 75 wherein said alert comprises an alert that a turn has been missed.

81. The system in claim 71 wherein said display comprises a dot-matrix pixelated display, said dot-matrix pixelated display operable to display a textural driver instruction.

82. The system in claim 81 wherein said display is selected from the group consisting of a vacuum fluorescent display, an organic electro-luminescent display, a field-emission display, a plasma display, a light-emitting diode display, and a liquid crystal display.

83. The system in claim 71 wherein said interior rearview mirror assembly comprises a housing and wherein said display is positioned at said housing.

84. The system in claim 71 wherein said vehicle further includes at least one exterior rearview mirror assembly.

85. The system in claim 84 wherein said global-positioning system receiver comprises an antenna.

86. The system in claim 85 wherein said antenna is positioned at one of said interior mirror assembly and said exterior mirror assembly.

87. The system in claim 86 wherein said antenna is positioned at said interior mirror assembly.

88. The system in claim 86 wherein said antenna is positioned at said exterior rearview mirror assembly.

89. The system in claim 71 wherein said receiver is positioned at said interior mirror assembly.

90. The system in claim 71 wherein said navigation system includes a vehicle data bus connection.

91. The system in claim 71 wherein said short-range radio frequency wireless communication link comprises a BLUETOOTH protocol.

92. The system in claim 71 wherein said display displays at least one chosen from compass and directional heading information.

93. The system in claim 71 further including an audio output generator indicating a need to change direction.

94. The system in claim 71 wherein said display comprises a reconfigurable display.

95. The system in claim 94 wherein said display also displays other vehicle functions.

96. The system in claim 71 wherein said user input comprises voice input.

97. The system in claim 96 wherein said vehicle includes a system for receiving voice commands from the driver.

98. The system in claim 71 wherein said user input comprises a keypad.

99. The system in claim 98 wherein said keypad is connected with said interior mirror assembly.

100. The system in claim 98 wherein said keypad is wirelessly connected with said interior mirror assembly.

101. The system in claim 71 wherein said reflective element comprises an electro-optic reflective element.

102. The system in claim 101 wherein said electro-optic reflective element comprises an electrochromic reflective element.

103. The system in claim 71 wherein said turn-by-turn instructions comprise at least one chosen from (i) direction, (ii) when to turn, and (iii) how far until the turn.

104. A navigation system suitable for use in a vehicle comprising:

a vehicle;

said vehicle including an interior rearview mirror assembly, said interior rearview mirror assembly comprising an interior reflective element;

a database at a site remote from said vehicle, said database including at least one chosen from map data and directory data;

a global-positioning system receiver, said global-positioning system receiver locatable in said vehicle during a road journey, said global-positioning system receiver operable to receive signals from satellites external to said vehicle;

a transceiver operable to engage in a wireless communication with a remote transceiver located at a site remote from said vehicle to a transceiver, said transceiver locatable in said vehicle during said road journey;

said transceiver operable to receive a wireless data transmission from said remote transceiver of data derived from said database;

a user input whereby a user can input a destination, said system responsive to said input of said destination by wirelessly communicating said destination to said remote transceiver;

said wireless data transmission from said remote transceiver to said transceiver comprising downloading of directions generally to said destination, said directions being derived from said database;

a display displaying turn-by-turn instructions to said destination during said road journey, said turn-by-turn instructions being based on said downloaded directions and on said signals received by said global-positioning system receiver;

wherein said navigation system includes a short-range wireless radio frequency communication link;

wherein said user input comprises at least one chosen from a voice input and a keypad input; and wherein said reflective element comprises an electro-optic reflective element.

105. The system in claim 104 wherein said display is at or adjacent to said interior rearview mirror assembly.

106. The system in claim 105 wherein said display is mounted to one chosen from said interior rearview mirror assembly support and a mirror mount.

107. The system in claim 105 wherein said display is mounted either above or below said reflective element.

108. The system in claim 104 including an alert to the driver, said alert comprising at least one chosen from an audible alert and a visible alert.

109. The system in claim 108 wherein said alert comprises an audible alert.

110. The system in claim 108 wherein said alert comprises a visible alert.

111. The system in claim 110 wherein said visible alert comprises a flashing display.

112. The system in claim 108 wherein said alert comprises an alert that a turn is being approached.

113. The system in claim 108 wherein said alert comprises an alert that a turn has been missed.

114. The system in claim 104 wherein said display comprises a dot-matrix pixelated display, said dot-matrix pixelated display operable to display a textural driver instruction.

115. The system in claim 114 wherein said display is selected from the group consisting of a vacuum fluorescent display, an organic electro-luminescent display, a field-emission display, a plasma display, a light-emitting diode display, and a liquid crystal display.

116. The system in claim 104 wherein said interior rearview mirror assembly comprises a housing and wherein said display is positioned at said housing.

117. The system in claim 104 wherein said vehicle further includes at least one exterior rearview mirror assembly.

118. The system in claim 117 wherein said global-positioning system receiver comprises an antenna.

119. The system in claim 118 wherein said antenna is positioned at one of said interior mirror assembly and said exterior mirror assembly.

120. The system in claim 119 wherein said antenna is positioned at said interior mirror assembly.

121. The system in claim 104 wherein said receiver is positioned at said interior mirror assembly.

122. The system in claim 119 wherein said antenna is positioned at said exterior rearview mirror assembly.

123. The system in claim 104 wherein said navigation system includes a vehicle data bus connection.

124. The system in claim 104 wherein said short-range radio frequency wireless communication link comprises a BLUETOOTH protocol.

125. The system in claim 104 wherein said display displays at least one chosen from compass and directional heading information.

126. The system in claim 104 further including an audio output generator indicating a need to change direction.

127. The system in claim 104 wherein said display comprises a reconfigurable display.

128. The system in claim 127 wherein said display also displays other vehicle functions.

129. The system in claim 104 wherein said user input comprises voice input.

130. The system in claim 129 wherein said vehicle includes a system for receiving voice commands from the driver.

131. The system in claim 104 wherein said user input comprises a keypad.

132. The system in claim 131 wherein said keypad is connected with said interior mirror assembly.

133. The system in claim 131 wherein said keypad is wirelessly connected with said interior mirror assembly.

134. The system in claim 104 wherein said electro-optic reflective element comprises an electrochromic reflective element.

135. The system in claim 104 wherein said turn-by-turn instructions comprise at least one chosen from (i) direction, (ii) when to turn, and (iii) how far until the turn.

* * * * *

UNITED STATES PATENT AND TRADEMARK OFFICE
CERTIFICATE OF CORRECTION

PATENT NO.         : 7,158,881 B2                                            Page 1 of 1
APPLICATION NO. : 10/755627
DATED              : January 2, 2007
INVENTOR(S)        : McCarthy et al.

It is certified that error appears in the above-identified patent and that said Letters Patent is hereby corrected as shown below:

On the Title Page, Item (57) ABSTRACT
Line 6 of the Abstract, "vehicles" should be --vehicle--
Line 9 of the Abstract, "received" should be --receive--

Column 1
Line 10, "6,447,464" should be --6,477,464--

Signed and Sealed this

Second Day of September, 2008

JON W. DUDAS
*Director of the United States Patent and Trademark Office*